United States Patent [19]

Fodor

[11] 4,386,011

[45] May 31, 1983

[54] OLEFIN POLYMERIZATION WITH CATALYSTS CONTAINING FOOD GRADE ADDITIVES

[75] Inventor: Lawrence M. Fodor, Bartlesville, Okla.

[73] Assignee: Phillips Petroleum Company, Bartlesville, Okla.

[21] Appl. No.: 306,444

[22] Filed: Sep. 28, 1981

[51] Int. Cl.$^3$ .............................................. C08F 4/64
[52] U.S. Cl. .............................. 252/429 B; 526/139; 526/140; 526/142
[58] Field of Search .................................... 252/429 B

[56] References Cited

U.S. PATENT DOCUMENTS

| | | | |
|---|---|---|---|
| 3,227,676 | 1/1966 | Mills et al. | 260/45.85 |
| 3,484,402 | 12/1969 | Drake et al. | 260/23 |
| 3,496,128 | 2/1970 | Casey et al. | 260/23 |
| 3,502,634 | 3/1970 | Stedefeder et al. | 252/429 B X |
| 3,758,621 | 9/1973 | Morikawa et al. | 252/429 B X |
| 3,922,249 | 11/1975 | Mills | 260/45.8 R |
| 3,977,997 | 8/1976 | Schick et al. | 252/429 B |
| 4,028,481 | 6/1977 | Shiomura et al. | 252/429 B X |
| 4,038,471 | 7/1977 | Castner | 252/429 B X |
| 4,048,415 | 9/1977 | Matsuzawa et al. | 252/429 B X |
| 4,130,503 | 12/1978 | Fodor | 252/429 B |
| 4,142,991 | 3/1979 | Arzoumanidis et al. | 252/429 B |
| 4,182,816 | 1/1980 | Caunt et al. | 252/429 B X |
| 4,237,029 | 12/1980 | Fodor | 252/429 B |
| 4,260,710 | 4/1981 | Staiger et al. | 252/429 B X |

Primary Examiner—Patrick Garvin

[57] ABSTRACT

Olefin polymerization catalyst can be obtained by mixing a transition metal compound (e.g. TiCl$_3$) and an adjuvant selected from specific hindered phenols, esters of thiodialkanoic acids, esters of phosphorous acid and esters of phosphoric acid; the adjuvants are compatible with FDA regulations for food.

27 Claims, No Drawings

OLEFIN POLYMERIZATION WITH CATALYSTS CONTAINING FOOD GRADE ADDITIVES

This invention relates to the polymerization of olefins, more particularly of propylene, utilizing transition metal catalysts. More specifically the invention relates to the polymerization of olefins with $TiCl_3$/organometal complex catalysts prepared with a promoter which is permissible to be present in the polymers made when these polymers get into contact with food products under Food and Drug Administration regulations.

BACKGROUND OF THE INVENTION

Olefin polymerization, particularly the polymerization of propylene with $TiCl_3$ catalysts, is a highly developed technology. Various catalysts and processes to produce such catalysts have been developed for the production of highly stereospecific polyolefins. High productivity and low solubles content are two goals that frequently were mutually exclusive. Commercial unmodified $TiCl_3$ catalysts for propylene polymerization generally permit productivities of around 600–2000 pounds of polypropylene per pound of catalyst, with xylene-solubles of about 8–15 weight percent. Modern high productivity $TiCl_3$ propylene polymerization catalysts are those with productivities around 3000–4000 pounds of polymer per pound of catalyst with xylene-solubles content of about 5–15 weight percent.

Specific procedures and additives have been developed to increase productivity and reduce xylene-solubles content. A problem of such additives is, however, that they frequently are contained in small quantities in the final polymer and render the final polymer useless for certain food related applications.

THE INVENTION

It is one object of this invention to provide a catalyst for the production of a polymer that is useful for contact with products for human consumption.

A further object of this invention is to provide catalysts containing an adjuvant which is permissible in small quantities in polymers contacting food for human consumption.

A further object of this invention is to provide a process to produce such a catalyst.

Yet another object of this invention is to provide a process for the polymerization of olefins using such a catalyst.

These and other objects, advantages, details, features and embodiments of this invention will become apparent from the following detailed description of the invention and the appended claims.

In accordance with this invention, it has been found that certain food grade polymer additives can be used as olefin polymerization catalyst adjuvants to obtain a food grade polymer with high productivity and/or low solubles content.

More specifically, the catalyst used in the olefin polymerization in this invention is obtained by mixing a catalyst component with an adjuvant composition comprising at least one compound selected from the group consisting of hindered phenolic compounds as defined below,
esters of thiodialkanoic acids as defined below,
mono- and diesters of phosphorous acid as defined below,
esters of phosphoric acid as defined below.

Thus, in accordance with the first embodiment of this invention, a transition metal catalyst component is provided which is obtained by mixing an initial transition metal catalyst component with the adjuvant defined in more detail below. The adjuvant is preferably employed in the transition metal catalyst in a quantity in the range of about 5 to 20 weight percent based on the total catalyst weight including the transition metal catalyst component.

The Adjuvant

In accordance with this invention an adjuvant is used in the coordination catalyst component which is selected from the group consisting of hindered phenolic compounds, esters of thiodialkanoic acids mono- and diesters of phosphorous acid and esters of phorphoric acid and mixtures of these adjuvant components. More specifically the individual compounds useful for the catalyst preparation in accordance with this invention are contained in the following groups:

a. The hindered phenols useful as an adjuvant in this invention have one or more groups T- having the formula

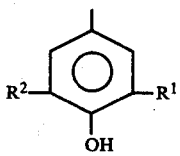
(1)

wherein $R^1$ and $R^2$ are the same or different alkyl radicals having 1 to 8 carbon atoms, the tertiary alkyl radicals being presently most preferred. Due to their availability the preferred hindered phenols are presently those that can be characterized as being 3,5-di-tert.-butyl-4-hydroxyphenyl substituted alkyl esters of acids selected from the group consisting of phosphonic acid and propionic acid;

and the hindered phenols having the formula $$R^3\text{—}T \qquad (2)$$

wherein $R^3$ is an alkyl radical of 1 to 8, preferably 2 to 6 carbon atoms, and T is the hindered phenolic group shown above.

b. the esters of thiodialkanoic acids can be generally characterized by the formula $$R^7\text{—OOC—}R^5\text{—S—}R^4\text{—COO—}R^6 \qquad (3)$$

wherein the radicals $R^4$ and $R^5$ are alkylene radicals having 2 to 6 carbon atoms, preferably 1,2-ethylene, the radicals $R^6$ and $R^7$ are alkyl radicals having ten to twenty carbon atoms.

c. the esters of phosphorous acid useful in accordance with this invention can be characterized by the formulae:

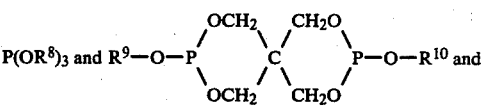

d. the esters of phosphoric acid $$(TO)_3PO$$

wherein $R^8$ is an alkaryl radical containing from 10 to 30 carbon atoms, $R^9$ and $R^{10}$ are the same or different selected from alkyl, cycloalkyl, aryl, the halo-substituted derivatives thereof and combinations such as alkaryl, aralkyl and the like, containing from 1 to 20 carbon atoms.

Examples of suitable compounds under a. include tetrakis[methylene-3-(3,5-di-t-butyl-4-hydroxyphenyl)-propionate]methane, octadecyl[3-(3',5'-di-t-butyl-4-hydroxyphenyl)]propionate, di-n-octadecyl(3,5-di-t-butyl-4-hydroxybenzyl)phosphonate, and 2,6-di-t-butyl-4-methylphenol.

Examples of suitable compounds under b. include dilaurylthiodipropionate and distearylthiodipropionate.

Examples of suitable compounds under c. include trisnonylphenylphosphite and distearylpentaerythritoldiphosphite.

An example of a suitable compound under d. is tris(3,5-di-t-butyl-4-hydroxyphenyl)phosphate.

The most preferred compounds for catalysts employed in propylene polymerization since catalyst activity is improved and soluble polymer formation is decreased are distearylpentaerythritoldiphosphite and di-n-octadecyl(3,5-di-t-butyl-4-hydroxybenzyl)phosphonate.

The Transition Metal Compound

The transition metal compound used for the preparation of the catalyst composition is a compound of a metal of groups IVB to VIB of the Periodic Table. These compounds are well known coordination catalyst compositions. The preferred group of compounds are titanium, vanadium and/or chromium compounds, particularly their reduced compounds. Most preferably, titanium trihalides having the formula $$TiX_3 \qquad (4)$$

can be used wherein X is Cl, Br or I, preferably Cl. The $TiX_3$ component can also contain some aluminum trihalide, see U.S. Pat. No. 4,130,503, col. 1, line 39 for suitable disclosure. Preferably the transition metal catalyst component contains $TiX_3$ and $AlX_3$ (particularly $AlCl_3$) in a mole ratio in the range of 1:0.05 to 1:1.

The catalyst composition, in accordance with this invention, is preferably prepared by mixing the ingredients. This can advantageously be done by vigorous agitation such as obtained in a mill, particularly a vibratory ball mill. It is convenient to add the solid ingredients to the ball mill first and thereafter the liquid ingredients such as titanium tetrachloride when employed. The mixing is carried out under conditions that are conventional in this technology. The temperature is usually kept well below the boiling point of any of the liquid ingredients. The milling time when employing a vibratory ball mill is generally in the range of 1 to 100 hours. The milling temperature will usually range from 0° to 180° F.

Another additive that can be used in the preparation of the transition metal catalyst component is an aluminum trihalide, preferably aluminum trichloride. This additive can be used alone or in conjunction with the adjuvant. The aluminum trihalide is preferably used in a quantity of about 5 to 15 weight percent based on the catalyst component, i.e. excluding the cocatalyst, but including the adjuvant.

The Cocatalyst

The coordination catalyst component obtained as described above is used together with a cocatalyst component thus forming a catalyst system for olefin polymerization. The cocatalyst can be any of the usually employed cocatalyst compositions that are known in this art. Generally these cocatalyst compositions are organometal compounds of a group I to III metal. Preferably an organoaluminum compound is utilized as a cocatalyst which has the formula $$AlR_b^{12}X_{3-b} \qquad (5)$$

wherein $R^{12}$ represents an alkyl radical having 1 to 8 carbon atoms, preferably 2 to 6 carbon atoms, X is chlorine, bromine or iodine and b is an integer of 1 to 3. Specific examples for these preferred aluminum alkyl compounds are dimethylaluminum chloride, methylethylaluminum bromide, triethylaluminum, n-propylaluminum dichloride, diethylaluminum chloride, and combinations thereof such as methylaluminum sesquibromide and ethylaluminum sesquichloride.

The cocatalyst and the coordination catalyst components are employed in relative quantities generally employed in this art. Specifically the mole ratio of $TiCl_3$ to group I to III metal compounds in the cocatalyst is in the range of about 40:1 to about 500:1.

A further embodiment of this invention resides in a process to polymerize olefins having 2 to 10 carbon atoms. The process is particularly applicable to the polymerization of α-olefins under usually employed polymerization conditions utilizing a catalyst as defined above. Preferably the polymerization is carried out in the liquid phase, i.e. under temperature and pressure conditions to keep a diluent as well as the monomer utilized essentially in the liquid phase. The polymerization conditions generally are defined to be the following ranges:

Temperature: 32° to 400° F.
Pressure: 50 to 600 psig
Time: 0.5 to 5 hours.

For propylene polymerization, temperatures of about 100° to 212° F., preferably from about 120° to 190° F. are used.

Conventional batch or continuous polymerization processes can be employed with the catalysts of this invention. For example, polymerization can be effected in the presence of a hydrocarbon diluent or solvent inert in the process, e.g. a paraffin such as isobutane, or in the absence of a diluent or solvent when polymerization is accomplished in the presence of liquid monomer which is presently preferred when propylene is polymerized. Molecular weight control of the polymeric product is effected by the use of hydrogen as is known to those skilled in the art.

The amount of catalyst employed in 1 liter of reactants, catalyst, cocatalyst, hydrogen (if used) and liquid propylene in propylene polymerization generally ranges from about 0.01 to 0.2 gram.

The following examples are intended to further illustrate the invention without undue limitation of its scope.

EXAMPLE I

Catalyst Preparation

Catalysts were prepared in a ball milling operation employing a spherical vessel of 250 cc volume agitated in a vibratory ball mill manufactured by Siebtechnik, G.m.b.H. (Mulheim-Ruhr). This machine provides a frequency of 1760 cycles/minute and an amplitude of ⅜ inch. The ball charge was 300 g in each instance of ⅜ inch diameter steel balls.

The procedure consisted of charging the steel vessel containing the balls under a nitrogen atmosphere in a dry box with a weighed amount of the ingredients, with any liquids being added last. After sealing the vessel it was removed from the dry box, attached to the vibratory mill and agitated the specified time at ambient temperature and with cooling water directed on the exterior of the vessel. The estimated temperature inside the vessel was about 100°–150° F. Following the milling, the vessel was dried, returned to the dry box and the contents poured onto a coarse screen to catch the balls. The milled product was passed through a 60 mesh screen (U.S. Sieve Series) and stored under nitrogen in the dry box until ready for use.

The amounts and types of ingredients charged to the milling vessel and milling times employed are given in Tables 1A and 1B.

TABLE 1A

| Catalyst No. | Milling Time, hrs | TiCl$_3$AA[b] g | TiCl$_3$AA[b] wt. % | Adjuvants[a] g | Adjuvants[a] |
|---|---|---|---|---|---|
| 1 | 22.5 | 10 | 100 | 0 | (control) |
| 2 | 24 | 13.1 | 87.3 | 1.9 | TNPP |
| 3 | 17 | 8.5 | 85 | 1.5 | DLTDP |
| 4 | 22 | 8.5 | 85 | 1.5 | BHT |
| 5 | 22 | 8.5 | 85 | 1.5 | TMPM |
| 6 | 21 | 8.5 | 85 | 1.5 | ODHP |
| 7 | 16.7 | 8.5 | 85 | 1.5 | THPP |
| 8 | 25 | 10.2 | 85 | 1.8 | DTPD |
| 9 | 21 | 8.5 | 89 | 1.5 | DOHP |
| 10 | 25 | 10.8 | 90 | 1.2 | DTPD |
| 11 | 4 | 8.0 | 80 | 2.0 | DTPD |

[a]TNPP is trisnonylphenylphosphite.
DLTDP is dilaurylthiodipropionate.
BHT is 2,6-di-t-butyl-4-methylphenol.
TMPM is tetrakis[methylene-3-(3,5-di-t-butyl-4-hydroxyphenyl)propionate]methane.
ODHP is octadecyl[3-(3,5-di-t-butyl-4-hydroxyphenyl)]-propionate.
THPP is tris(3,5-di-t-butyl-4-hydroxyphenyl)phosphate.
DOHP is di-n-octadecyl(3,5-di-t-butyl-4-hydroxybenzyl)-phosphonate.
DTPD is distearylpentaerythritoldiphosphite.
[b]TiCl$_3$AA is TiCl$_3 \cdot \frac{1}{3}$AlCl$_3$.

TABLE 1B

| Catalyst No. | Milling Time, hrs | TiCl$_3$AA g | TiCl$_3$AA wt. % | Adjuvants[c] |
|---|---|---|---|---|
| 12 | 17.5 | 9.0 | 90 | 1.0 DOHP |
| 13 | 17.5 | 8.75 | 87.5 | 1.25 DOHP |
| 14 | 17.5 | 8.25 | 82.5 | 1.75 DOHP |
| 15 | 21.6 | 8.0 | 80 | 2.0 DOHP |
| 16 | 21.6 | 8.5 | 85 | 1.0 DOHP, 0.5 AlCl$_3$ |
| 17 | 21.6 | 8.0 | 80 | 1.5 DOHP, 0.5 AlCl$_3$ |
| 18 | 15.4 | 7.5 | 75 | 1.25 DOHP, 1.25 AlCl$_3$ |
| 19 | 17.8 | 7.5 | 75 | 1.0 DOHP, 0.5 AlCl$_3$ |
| 20 | 23.4 | 7.5 | 75 | 1.25 DOHP, 0.25 AlCl$_3$ |
| 21 | 17.8 | 7.5 | 75 | 1.5 DOHP, 1.0 AlCl$_3$ |
| 22 | 24 | 9.6 | 80 | 1.2 DTPD, 1.2 TNPP |

[c]See footnote (a) under Table 1A for description of adjuvants.

EXAMPLE II

Propylene Polymerization

Propylene polymerization was conducted in a one liter, stirred, stainless steel reactor. The reactor was conditioned for each run by filling it with n-hexane, adding 5 mL of 25% diethylaluminum chloride in n-hexane, and heating the contents for 1 hour at 275° F. (135° C.). The reactor contents were dumped and the reactor flushed with dry nitrogen as it cooled down to about room temperature (about 80° F., 27° C.). The catalyst and the cocatalyst, 2 mL of diethylaluminum chloride (DEAC) dissolved in n-hexane amounting to 3.2 mmoles DEAC, were charged to the reactor while maintaining a nitrogen flush. The port was sealed and ¼ liter of hydrogen measured at STP was added. The reactor was then charged with about ½ liter of liquid propylene and heating was started. After reaching the specific reaction temperature, the reactor was filled liquid full with propylene and maintained in that condition throughout each run by means of a propylene reservoir open to the reactor and pressured to 515 psig (3.55 MPa) with dry nitrogen. Unpon completion of a run heating gas discontinued, the propylene and remaining hydrogen were vented and the polymer recovered. The polymer was washed with methanol, treated with a conventional antioxidant, e.g. 2,6-di-t-butyl-4-methylphenol, as known in the art, and the composition dried in a vacuum oven.

Since propylene-soluble polymer was not separated from propylene-insoluble polymer in the process used, the soluble polymer results reported are total soluble polymer formed, e.g. propylene-soluble polymer plus xylene-soluble polymer. Xylene-soluble polymer measurements were determined from a sample of the dried, stabilized polymer produced in each run as known in the art. The polymerization results are presented in Tables 2A, 2B, 2C and 2D.

The screening results indicate that relatively active catalysts can be made by ball milling the specified food grade polymer additives with TiCl$_3$AA. The results obtained in runs 10, 11 based on relatively good productivity values coupled with substantial lowering of soluble formation, suggested additional experiments with the adjuvants DTPD (distearylpentaerythritoldiphosphite) and DOHP (di-n-octadecyl(3,5-di-t-butyl-4-hydroxybenzyl)phosphonate) as a component with TiCl$_3$AA.

The results obtained with catalysts containing these adjuvants are presented in Tables 2B, 2C and 2D.

In comparing the results with the appropriate controls of Table 2A, runs 1–3, it can be seen that soluble polymer formation is reduced in some instances. The best results are obtained with catalysts containing 85 wt. % TiCl$_3$AA and 15 wt. % DTPD. For example, catalyst no. 8, in run 15, has a calculated productivity at 60° C. of 1010 g polymer per g TiCl$_3$AA and 6.2 wt. % solubles whereas catalyst no. 1 in run 1 has a calculated productivity at 60° C. of 1220 g polymer per g TiCl$_3$AA and 11 wt. % solubles. Slightly poorer results are obtained with catalysts containing either 10 or 20 wt. % DTPD.

Run 18 suggests that a combination of 20 wt. % mixed adjuvants provides a more active, stereospecific catalyst than that obtained with 20 wt. % DTPD in view of the higher productivity value and lower solubles level.

TABLE 2A

Control Runs and Preliminary Screening Results

| Run No. | Catalyst No. | wt. mg | wt. % TiCl₃AA | Reaction Temp. °C. | Polymer Yield, g | Productivity[a] g/g cat | g/g TiCl₃AA | Soluble Polymer, wt. % | Remarks |
|---|---|---|---|---|---|---|---|---|---|
| 1 | 1 | 59.5 | 100 | 60 | 72.6 | 1220 | 1220 | 11 | control |
| 2 | 1 | 34.3 | 100 | 71 | 65.3 | 1900 | 1900 | 16 | control |
| 3 | 1 | 25.3 | 100 | 79 | 58.3 | 2300 | 2300 | 21 | control |
| 4 | 2 | 35.9 | 87.3 | 71 | 48.1 | 1340 | 1530 | 14 | |
| 5 | 3 | 49.7 | 85 | 79 | 68.3 | 1320 | 1550 | 17 | |
| 6 | 4 | 23.0 | 85 | 79 | 41.5 | 1800 | 2120 | 25 | |
| 7 | 5 | 39.0 | 85 | 79 | 57.3 | 1470 | 1730 | 18 | |
| 8 | 6 | 32.4 | 85 | 79 | 62.0 | 1910 | 2250 | 20 | |
| 9 | 7 | 14.7 | 85 | 79 | 24.6 | 1670 | 1960 | 22 | |
| 10 | 8 | 52.7 | 85 | 79 | 78.2 | 1480 | 1740 | 12 | |
| 11 | 9 | 34.0 | 85 | 71 | 58.1 | 1710 | 2010 | 9.1 | |

[a] Expressed in terms of grams polymer per gram solid catalyst per hour (g/g cat) and when catalyst contains an adjuvant, in terms of grams polymer per gram TiCl₃AA per hour (g/g TiCl₃AA). The latter value permits direct comparison with a control run at the same temperature. For example, in run 6, the catalyst contained 85 wt. % TiCl₃AA and 15 wt. % adjuvant. The total catalyst yielded 1800 g/g cat as determined by dividing polymer weight in grams by catalyst weight in grams. Since the active portion of the total catalyst is TiCl₃AA, the productivity for that portion is calculated by multiplying catalyst weight, 0.0230 g × 0.80 = 0.0196 g and dividing polymer produced, 41.5 g by 0.0196 g to give 2117 g/g TiCl₃AA, which is rounded off to 2120 g/g TiCl₃AA.

TABLE 2B

Propylene Polymerization Catalysts Containing TiCl₃AA and DTPD

| Run No. | Catalyst No. | wt. mg | wt. % TiCl₃AA | Reaction Temp. °C. | Polymer Yield, g | Productivity g/g cat | g/g TiCl₃AA | Soluble Polymer, wt. % |
|---|---|---|---|---|---|---|---|---|
| 12 | 10 | 70.5 | 90 | 60 | 53.9 | 765 | 850 | 6.0 |
| 13 | 10 | 45.5 | 90 | 71 | 63.7 | 1400 | 1560 | 10 |
| 14 | 10 | 32.8 | 90 | 79 | 59.3 | 1810 | 2010 | 16 |
| 15 | 8 | 58.4 | 85 | 60 | 50.2 | 860 | 1010 | 6.2 |
| 10[b] | 8 | 52.7 | 85 | 79 | 78.2 | 1480 | 1740 | 12 |
| 16 | 11 | 52.6 | 80 | 60 | 29.9 | 568 | 710 | 9.3 |
| 17 | 11 | 31.0 | 80 | 79 | 33.6 | 1080 | 1350 | 15 |
| 18 | 22 | 31.2 | 80[c] | 79 | 37.0 | 1190 | 1490 | 13 |

[b] Repeated from Table 2A.
[c] Catalyst contains 80 wt. % TiCl₃AA, 10 wt. % each of DTPP and TNPP.

TABLE 2C

Catalysts Containing TiCl₃AA and DOHP

| Run No. | Catalyst No. | wt. mg | wt. % TiCl₃AA | Reaction Temp. °C. | Polymer Yield, g | Productivity g/g cat | g/g TiCl₃AA | Soluble Polymer, wt. % |
|---|---|---|---|---|---|---|---|---|
| 19 | 9 | 36.0 | 85 | 66 | 48.3 | 1340 | 1580 | 6.3 |
| 20 | 9 | 28.0 | 85 | 66 | 81.7 | 2920[e] | 3440[e] | 6.9 |
| 11[d] | 9 | 34.0 | 85 | 71 | 58.1 | 1710 | 2010 | 9.1 |
| 21 | 9 | 34.8 | 85 | 71 | 122.6 | 3520[e] | 4140[e] | 13 |
| 22 | 9 | 41.6 | 85 | 79 | 82.4 | 1980 | 2330 | 13 |
| 23 | 9 | 26.4 | 85 | 79 | 113.9 | 4310[e] | 5070[e] | 16 |
| 24 | 12 | 54.0 | 90 | 79 | 108.6 | 2010 | 2230 | 15 |
| 25 | 12 | 30.1 | 90 | 79 | 143.5 | 4770[e] | 5300[e] | 22 |
| 26 | 13 | 39.7 | 87.5 | 79 | 82.0 | 2070 | 2370 | 17 |
| 27 | 14 | 32.7 | 82.5 | 79 | 67.3 | 2060 | 2500 | 15 |
| 28 | 15 | 30.1 | 80 | 79 | 54.6 | 1810 | 2260 | 15 |

[d] Repeated from Table 2A.
[e] 2.5 hour run.

TABLE 2D

Propylene Polymerization Catalysts Containing TiCl₃AA, DOHP and AlCl₃

| Run No. | Catalyst No. | wt. mg | wt. % TiCl₃AA | wt. % AlCl₃ | Reaction Temp. °C. | Polymer Yield, g | Productivity g/g cat | g/g TiCl₃AA | Soluble Polymer, wt. % |
|---|---|---|---|---|---|---|---|---|---|
| 29 | 16 | 37.5 | 85 | 5 | 79 | 58.6 | 1560 | 1840 | 14 |
| 30 | 17 | 45.8 | 80 | 5 | 79 | 76.7 | 1670 | 2090 | 9.9 |
| 31 | 18 | 31.7 | 70 | 15 | 71 | 28.1 | 886 | 1270 | 11 |
| 32 | 19 | 37.7 | 75 | 15 | 71 | 52.9 | 1400 | 1870 | 11 |
| 33 | 20 | 38.0 | 75 | 12.5 | 71 | 38.9 | 1020 | 1360 | 8.4 |
| 34 | 21 | 36.0 | 75 | 10 | 71 | 43.9 | 1220 | 1630 | 6.3 |

[f] Balance of catalyst weight is DOHP.

The run 19 results shows a calculated productivity similar to that expected for control catalyst 1 if run at The effect of substituting a portion of DOHP with AlCl₃ in the catalyst preparation is shown in Table 2D. In general, the results suggest that more stereospecific catalysts are made, based on reduced soluble polymer formation, but slightly less activity is observed, based on somewhat lower productivity values. However, catalyst no. 17 of run 30 shows almost the activity of control catalyst no. 1 but produces only about ½ the soluble polymer.

Reasonable variations and modifications will fully become apparent to those skilled in the art can be made from this invention without departing from the spirit and scope thereof.

What is claimed is:

1. A process to make a transition metal catalyst component useful in the polymerization of olefins comprising mixing an initial transition metal catalyst component with at least one adjuvant selected from the group consisting of esters of thiodialkanoic acids and mixtures thereof.

2. Process in accordance with claim 1 wherein said adjuvant and a transition metal compound are intensively mixed to obtain said transition metal catalyst component.

3. Process in accordance with claim 2 wherein said transition metal compound is milled with said adjuvant.

4. Process in accordance with claim 2 wherein said transition metal compound is a reduced compound of titanium, vanadium or chromium.

5. Process in accordance with claim 4 wherein said transition metal compound is titanium halide containing aluminum trihalide.

6. Process in accordance with claim 1 wherein an aluminum trihalide is incorporated into the transition metal catalyst component as an additional additive.

7. Transition metal catalyst component produced in accordance with one of the preceeding claims.

8. Olefin polymerization catalyst comprising a transition metal catalyst component obtained in accordance with a process of one of the claims 1-6 and comprising an organometal cocatalyst.

9. Olefin polymerization catalyst in accordance with claim 8 wherein said organometal cocatalyst is an organoaluminum compound.

10. A process to make a transition metal catalyst component useful in the polymerization of olefins comprising mixing an initial transition metal catalyst component with at least one adjuvant selected from the group consisting of the esters of phosphorous acid having the formula

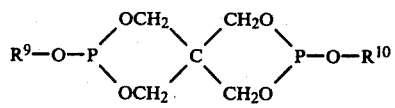

wherein $R^9$ and $R^{10}$ are the same or different groups selected from alkyl, cycloalkyl, aryl, the halo-substituted derivatives thereof and combinations thereof, containing from 1 to 20 carbon atoms, the esters of the phosphoric acid having the formula $(TO)_3PO$ wherein T is a group having the formula

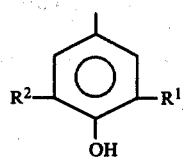

wherein $R^1$ and $R^2$ are the same or different alkyl radicals having 1 to 8 carbon atoms,
and mixtures thereof.

11. A process in accordance with claim 10 wherein said adjuvant and a transition metal compound are intensively mixed to obtain said transition metal catalyst component.

12. Process in accordance with claim 11 wherein said transition metal compound is milled with said adjuvant.

13. Process in accordance with claim 11 wherein said transition metal compound is a reduced compound of titanium, vanadium or chromium.

14. Process in accordance with claim 13 wherein said transition metal compound is titanium halide containing aluminum trihalide.

15. Process in accordance with claim 10 wherein an aluminum trihalide is incorporated into the transition metal catalyst component as an additional additive.

16. Transition metal catalyst component produced in accordance with a process as defined in one of the claims 10-15.

17. Olefin polymerization catalyst comprising a transition metal catalyst component obtained in accordance with a process of one of the claims 10-15 and comprising an organometal cocatalyst.

18. Olefin polymerization catalyst in accordance with claim 17 wherein said organometal cocatalyst is an organoaluminum compound.

19. A process to make a catalyst component useful in the polymerization of olefins comprising mixing an initial transition metal catalyst component, said transition metal being selected from the group consisting of titanium, vanadium and chromium, with at least one adjuvant selected from the group of hindered phenolic compounds being characterized as
  (a) T-substituted alkyl esters of phosphonic and propionic acids and
  (b) compounds having the formula $R^3—T$ wherein $R^3$ is an alkyl radical of 1-8 carbon atoms and T is a hindered phenol group having the formula

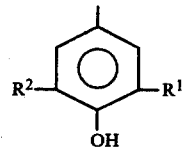

wherein $R^1$ and $R^2$ are the same or different alkyl radicals having 1 to 8 carbon atoms, and mixtures thereof.

20. Process in accordance with claim 19 wherein said adjuvant and a transition metal compound are intensively mixed to obtain said transition metal catalyst component.

21. Process in accordance with claim 20 wherein said transition metal compound is milled with said adjuvant.

22. Process in accordance with claim 20 wherein said transition metal compound is a reduced compound of titanium, vanadium or chromium.

23. Process in accordance with claim 22 wherein said transition metal compound is titanium halide containing aluminum trihalide.

24. Process in accordance with claim 19 wherein an aluminum trihalide is incorporated into the transition metal catalyst component as an additional additive.

25. Transition metal catalyst component produced in accordance with a process as defined in one of the claims 19–24.

26. Olefin polymerization catalyst comprising a transition metal catalyst component obtained in accordance with a process of one of the claims 19–24 and comprising an organometal cocatalyst.

27. Olefin polymerization catalyst in accordance with claim 26 wherein said organometal cocatalyst is an organoaluminum compound.

* * * * *

Dedication 4,386,011.—*Lawrence M. Fodor*, Bartlesville, Okla. OLEFIN POLYMERIZATION WITH CATALYSTS CONTAINING FOOD GRADE ADDITIVES. Patent dated May 31, 1983. Dedication filed May 29, 1984, by the assignee, *Phillips Petroleum Co.*

Hereby dedicates to the Public the entire remaining term of said patent.
[*Official Gazette July 31, 1984.*]